March 12, 1935.  S. C. SMITH  1,994,372
MEANS FOR RECLAIMING SOLVENT USED IN DRY CLEANING
Filed Dec. 9, 1931
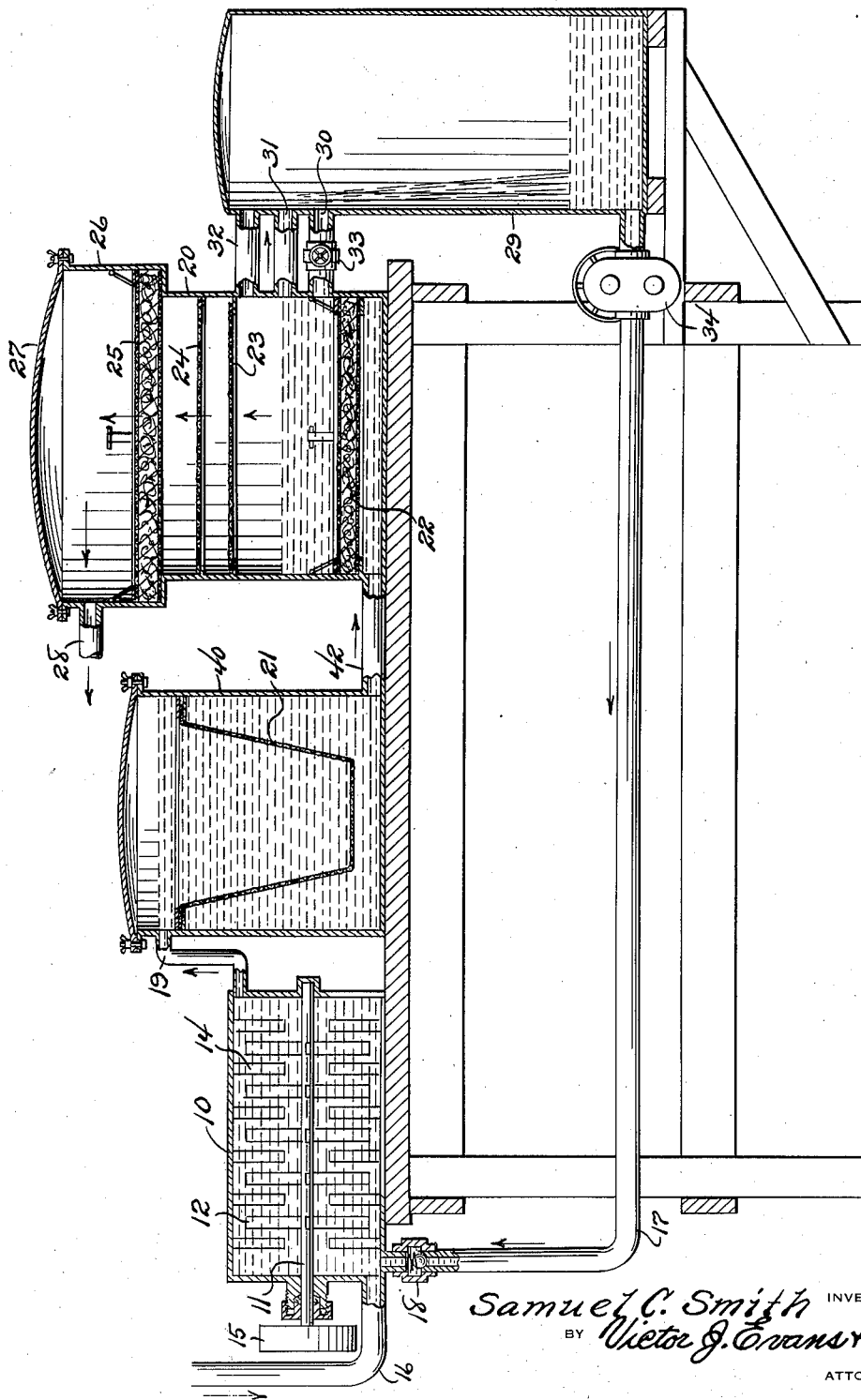
Samuel C. Smith INVENTOR
BY Victor J. Evans & Co.
ATTORNEY Patented Mar. 12, 1935

1,994,372

UNITED STATES PATENT OFFICE 1,994,372

MEANS FOR RECLAIMING SOLVENT USED IN DRY CLEANING

Samuel C. Smith, Greensboro, N. C.

Application December 9, 1931, Serial No. 579,952

2 Claims. (Cl. 210—44)

The object of the invention is to provide a means for cleaning or reclaiming the solvent used in dry cleaning by complete saponification without the formation of a hard soap lump, so that the solvent and the saponified medium may be dealt with as two liquids instead of a solid and liquid as is the case under the conventional practice.

With this object in view the invention consists in certain method steps and in a certain kind of apparatus of which a preferred embodiment is illustrated in the accompanying drawing, in which the figure is a vertical sectional view of apparatus effective for the purpose.

The active chemical agent used in the method is preferably potassium hydroxide dissolved in an organic solvent. Methyl alcohol, ethyl alcohol, diethylene glycol, and diethylene glycol monoethyl ether are organic solvents of which any one is effective for the purpose. To the caustic alkaline solution, there is added a small amount of water. The caustic solution prevents the formation of soaps soluble in the solvent.

An effective caustic solution consists of 1 pint of 50% aqueous solution of potassium hydroxide, 2 pints of water and five pints of ethyl alcohol.

The dirty solvent from the washing machine is carried into a mixer or homogenizer in which the caustic alkaline solution is also admitted. The homogenizer emulsifies the two liquids. All soaps, fatty acids and other impurities in the solvent are thus brought into contact with the alkali and are neutralized. Alkaline soaps are insoluble in dry cleaning solvent but are very soluble in the above-mentioned solvent. The emulsion containing the two components, namely, pure solvent and a mixture of water, organic solvent, alkaline soaps and other impurities extracted from the solvent, is carried to the homogenizer or emulsifier element and then to an element for separating the two components which may be either a settling tank in which the two solutions will separate by reason of the heavier gravitating to the bottom, or which may be a centrifugal separating apparatus in which the components are separated by centrifugal action.

In the illustrated embodiment of the invention, the homogenizer or emulsion forming element consists of a closed tank 10 in the ends of which is journalled a shaft 11, the latter being provided with spaced paddles 12 arranged in intercurrent relation with fixed paddles 14 mounted on the interior wall of the tank, so that when the shaft 11 turns, as it will do when its pulley 15 is driven, there may be relative movement between the shaft-carried and drum-carried paddles. The dry cleaning solvent is admitted to the tank 10 at one end and at the bottom thereof through a tubular conductor 16 which connects the tank direct with the washing machine. The caustic solution is also admitted to the tank at the forward end thereof through a pipe 17 and check valve 18. The rotation of the paddles 12 effects a mixing of the two liquids with the result that an emulsion is formed which passes through the pipe 19 into an intermediate settling tank 40, the pipe 19 connecting with the tank 40 near the top thereof. The intermediate settling tank is provided with a filtering screen 21 and the emulsified liquid, settling to the bottom of the tank, passes through this filter which partly breaks the emulsion. Passing from the bottom of the tank 40, through a pipe 42, the mixed liquid enters the tank 20 at the bottom thereof. Interiorly, this tank 20 is provided with a flange welded or otherwise secured to the wall surface and upon this flange is disposed a filter 22. At intermediate points in the height, the tank is interiorly provided with the breaker screens 23 and 24, above which and spaced from the upper is a second filter 25. This second filter rests on a ledge formed by the enlargement of the cross sectional area of the tank as indicated at 26. The tank is closed at the top on the enlarged portion by means of a removable cover 27 and the discharge pipe 28 communicates with this just below the cover.

The filter 25 may contain activated carbon.

The settling tank 29 has three tubular connections with the filtering tank, as indicated at 30, 31 and 32. The first of these is disposed at the level of the filter 22 and carries a valve 33. The second pipe connection 31 communicates with the tank 20 at about the level at which it is desired to discharge the caustic solution into the settling tank. The third pipe 32 connects with the pipe 20 just below the plane of the first screen 23.

The bottom of the settling tank is much below the plane of the bottom of the filtering tank and the pipe 17 connects with this settling tank at the bottom, a pump 34 being interposed in it to transfer the caustic solution back to the homogenizer.

The emulsion created by the homogenizer, as above stated, passes into the filtering tank 20 at the bottom and rises through the filter 22 on top of which the caustic solution forms until it reaches the level of the pipe 31, through which it passes and drops into the settling tank 29 from which it is transferred back to the homogenizer by the pump 34. Thus practically a constant level of the caustic solution is maintained in the settling tank.

In the filtering tank, the solvent, after passing through the filter 22, passes upward through the breaker screens 23 and 24 which serve to arrest any caustic globules that may be rising with the solvent. The solvent then passes through the filter 25 and back to the washer through the conduit 28. Since the volume of the caustic solution in tank 29 varies, it is compensated for by the solvent flowing back and forth through pipe 32.

The caustic solution may be drained from the main filtering tank by opening the valve 33.

The thorough mixing of the caustic solution in the homogenizer or mixer insures the complete saponification of all fatty matter which may be in the solution. The organic solvents will remove other impurities from the solvent much more effectively than pure water.

In the method herein disclosed, the caustic solution remains a liquid, no muck is formed. This will eliminate a great solvent loss as well as reduce to a minimum, the amount of caustic alkali needed.

In removing dry cleaning soap from solvent by chemical clarification, a large proportion of solvent will be lost in the soap muck formed. In the method herein disclosed, practically no solvent loss results.

The invention having been described, what is claimed as new and useful is:

1. Apparatus for the purpose indicated comprising a mixing tank, a filtering tank in communication with the mixing tank, and a settling tank in communication with the filtering tank and having a tubular conductor connecting it with the mixing tank, the settling tank having its bottom below the bottom of the filtering tank, the filtering tank being provided with a filter disposed a slight distance above its bottom which is above its point of communication with the mixing tank and having a tubular conductor connecting it with the settling tank above the plane of said filter, the filtering tank being provided with a second filter adjacent its top and with a discharge above the plane of this second filter.

2. Apparatus for the purpose indicated comprising a mixing tank, a filtering tank in communication with the mixing tank, and a settling tank in communication with the filtering tank and having a tubular conductor connecting it with the mixing tank, the settling tank having its bottom below the bottom of the filtering tank, the filtering tank being provided with a filter disposed a slight distance above its bottom which is above its point of communication with the mixing tank and having a tubular conductor connecting it with the settling tank above the plane of said filter, the filtering tank being provided with a second filter adjacent its top and with a discharge above the plane of this second filter, the filtering tank being further provided with spaced breaker screens disposed between the two filters but spaced from both.

SAMUEL C. SMITH.